United States Patent
Liu et al.

(10) Patent No.: US 10,926,345 B2
(45) Date of Patent: Feb. 23, 2021

(54) SCALE-STYLE MICRO-TEXTURE ELECTRODE WIRE MATERIAL AND PREPARATION METHOD THEREFOR AND USE THEREOF

(71) Applicant: NINGBO KANGQIANG MICRO-ELECTRONICS TECHNOLOGY CO., LTD., Zhejiang (CN)

(72) Inventors: Eryong Liu, Zhejiang (CN); Zhixiang Zeng, Zhejiang (CN); Jiliang Jiang, Zhejiang (CN); Fang Zheng, Zhejiang (CN); Liping Wang, Zhejiang (CN)

(73) Assignee: NINGBO KANGQIANG MICRO-ELECTRONICS TECHNOLOGY CO., LTD., Zhejiang (CN)

( * ) Notice: Subject to any disclaimer, the term of this patent is extended or adjusted under 35 U.S.C. 154(b) by 495 days.

(21) Appl. No.: 15/554,965

(22) PCT Filed: Dec. 2, 2016

(86) PCT No.: PCT/CN2016/108423
§ 371 (c)(1),
(2) Date: Aug. 31, 2017

(87) PCT Pub. No.: WO2017/092715
PCT Pub. Date: Jun. 8, 2017

(65) Prior Publication Data
US 2018/0050401 A1   Feb. 22, 2018

(30) Foreign Application Priority Data
Dec. 2, 2015   (CN) .......................... 201510868517.7

(51) Int. Cl.
*B23H 1/04* (2006.01)
*B23H 1/06* (2006.01)
(Continued)

(52) U.S. Cl.
CPC .............. *B23H 1/06* (2013.01); *B21C 1/003* (2013.01); *B23H 7/08* (2013.01); *C23C 2/06* (2013.01);
(Continued)

(58) Field of Classification Search
CPC ... B23H 1/04; B23H 1/06; B23H 7/06; B23H 7/065; B23H 7/08; C23C 2/02;
(Continued)

(56) References Cited

U.S. PATENT DOCUMENTS

2012/0273465 A1* 11/2012 Seong ..................... B21C 1/003
                                                             219/69.15
2013/0037523 A1   2/2013 Seong et al.
(Continued)

FOREIGN PATENT DOCUMENTS

CN   201239836   5/2009
CN   103537768   1/2014
(Continued)

OTHER PUBLICATIONS

International Search Report for international application No. PCT/CN2016/108423, dated Mar. 1, 2017 (4 pages, including English translation).

*Primary Examiner* — Hung D Nguyen
(74) *Attorney, Agent, or Firm* — Hamre, Schumann, Mueller & Larson, P.C.

(57) ABSTRACT

A scale-style micro-texture electrode wire material and a preparation method therefor and use thereof. In particular, the electrode wire material has a scale-style micro-texture layer on the surface, and the electrode wire material com-
(Continued)

prises: i) an alloy substrate layer as an inner layer; ii) an interdiffusion layer as an intermediate layer; and iii) a plating layer as an outer layer; and a contact angle of the electrode wire material to a cooling liquid is 105-150°. A method for preparing the electrode wire material and a use thereof. Due to the special surface bionic structure, the electrode wire can obviously reduce the cutting resistance and improve the cooling speed, thereby improving the cutting speed and effectively improving the use performance of the electrode wire. The preparation method has the characteristics of simple process and easy for industrial production.

14 Claims, 5 Drawing Sheets

(51) Int. Cl.
  *B23H 7/08* (2006.01)
  *C23C 2/38* (2006.01)
  *C23C 2/28* (2006.01)
  *C23C 28/02* (2006.01)
  *C23C 2/06* (2006.01)
  *B21C 1/00* (2006.01)
  *B23H 7/00* (2006.01)

(52) U.S. Cl.
  CPC ............... *C23C 2/28* (2013.01); *C23C 2/38* (2013.01); *C23C 2/385* (2013.01); *C23C 28/021* (2013.01); *C23C 28/025* (2013.01); *C23C 28/028* (2013.01)

(58) Field of Classification Search
  CPC .... C23C 2/06; C23C 2/08; C23C 2/12; C23C 2/26; C23C 2/28; C23C 2/38; C23C 2/385; C23C 28/02; C23C 28/021; C23C 28/023; C23C 28/025; C23C 28/028; B21C 1/003; B21C 1/02
  USPC ............... 219/69.1, 69.12, 69.15, 145.1, 219/145.21–145.23, 146.1, 146.21, 146.32
  See application file for complete search history.

(56) References Cited

U.S. PATENT DOCUMENTS

| | | |
|---|---|---|
| 2014/0110379 A1 | 4/2014 | Seong |
| 2014/0339200 A1 | 11/2014 | Seong |
| 2015/0306690 A1* | 10/2015 | Qian ............... B23H 7/08 219/69.12 |

FOREIGN PATENT DOCUMENTS

| | | |
|---|---|---|
| CN | 104400159 | 3/2015 |
| CN | 105834533 | 8/2016 |
| EP | 3006152 A1 | 4/2016 |
| JP | 2003-291030 | 10/2003 |
| JP | 2005-66750 A * | 3/2005 |
| JP | 2014-136285 | 7/2014 |
| KR | 100543847 B1 | 1/2006 |
| WO | 2014198254 | 12/2014 |

* cited by examiner 1. plating process  2. resistance / radiation composite heat treatment  3. drawing process

SCALE-STYLE MICRO-TEXTURE ELECTRODE WIRE MATERIAL AND PREPARATION METHOD THEREFOR AND USE THEREOF

TECHNICAL FIELD

The present invention relates to material field, and particularly to a scale-style micro-texture electrode wire material and preparation method therefor and use thereof.

BACKGROUND

Electrical discharge machining is mainly used in mold manufacturing, and also increasingly widely used in the processing of forming tool, precision small parts and special materials. Cutting speed of electrical discharge machining affects production efficiency, so how to improve wire's cutting speed always has been an important research focus in the relevant areas.

The material, the surface condition and the thermophysical properties of the electrode wire are key factors that affect the cutting efficiency in terms of device, processing technology and cutting electrode wire. During the cutting process, the electrode wire is prone to be overheated and then fused due to the absorption of large amounts of heat, so the cutting process requires improved cooling efficiency of the electrode wire. At the same time, debris is easy to accumulate in the cutting area, so the cutting process requires smooth discharge of debris.

In order to meet the increasing market demand, there is an urgent need in the art to develop a new electrode wire material with excellent cutting performance and a preparation method therefor.

SUMMARY OF INVENTION

The object of the present invention is to provide a new electrode wire material with excellent cutting performance and a preparation method therefor.

In the first aspect of the present invention, an electrode wire material is provided, and the electrode wire material has a scale-style micro-texture layer on the surface, and the electrode wire material comprises:
  i) an alloy substrate layer as an inner layer;
  ii) an interdiffusion layer as an intermediate layer;
  iii) a plating layer as an outer layer;
  and a contact angle of the electrode wire material to a cooling liquid is 105 to 150°.

In another preferred embodiment, the contact angle of the electrode wire material to the cooling liquid is 107 to 140°.

In another preferred embodiment, the contact angle of the electrode wire material to the cooling liquid is 110 to 135°, and preferably 112 to 130°.

In another preferred embodiment, the electrode wire material has a diameter of 0.05 to 1 mm, preferably 0.1 to 0.8 mm, and more preferably 0.15 to 0.6 mm.

In another preferred embodiment, in the electrode wire material, the inner layer has a diameter of 0.15 to 0.6 mm; and/or
  the intermediate layer has a thickness of 5 to 30 μm; and/or
  the outer layer has a thickness of 2 to 20 μm.

In another preferred embodiment, the inner layer has a diameter of 0.15 to 0.4 mm.

In another preferred embodiment, the intermediate layer has a thickness of 10 to 20 μm.

In another preferred embodiment, the outer layer has a thickness of 4 to 10 μm.

In another preferred embodiment, the scale-style micro-texture layer has a thickness of 2 to 20 μm.

In another preferred embodiment, the scale-style micro-texture layer has a thickness of 3 to 18 μm, and preferably 5 to 15 μm.

In another preferred embodiment, the alloy substrate layer is made from elements selected from the following group consisting of copper, zinc, tin, lead, and combinations thereof.

In another preferred embodiment, the interdiffusion layer is made from elements selected from the following group consisting of copper, zinc, tin, lead, and combinations thereof.

In another preferred embodiment, the plating layer is made from elements selected from the following group consisting of copper, zinc, tin, lead, and combinations thereof.

In another preferred embodiment, the electrode wire material has a tensile strength of 900 to 1200 MPa, and preferably 1100 MPa to 1200 MPa.

In another preferred embodiment, the electrode wire material has an elongation of 1 to 5%, and preferably 3 to 5%.

In another preferred embodiment, the electrode wire material is prepared by the method described in the second aspect of the present invention.

In the second aspect of the present invention, it provides a method for preparing the electrode wire material according to the first aspect of the present invention, comprising the following steps:
  1) providing a plated electrode wire, and heat-treating the plated electrode wire to obtain a heat-treated electrode wire;
  2) drawing the heat-treated electrode wire obtained in step 1) to obtain a drawn electrode wire; and
  3) annealing the drawn electrode wire obtained in step 2) to obtain the electrode wire material of the first aspect of the present invention.

In another preferred embodiment, the plated electrode wire comprises an alloy layer as a core layer and a metal plating layer on the surface of the core layer.

In another preferred embodiment, the alloy layer is made from materials selected from the following group consisting of a copper alloy and a stainless steel.

In another preferred embodiment, the metal plating layer is made from metals selected from the following group consisting of zinc, copper, tin, lead, and combinations thereof.

In another preferred embodiment, the plated electrode wire has a diameter of 0.01 to 5 mm, preferably 0.05 to 3 mm, and more preferably 0.1 to 2 mm.

In another preferred embodiment, the metal plating layer has a thickness of 1 to 50 μm, preferably 2 to 30 μm, and more preferably 4 to 15 μm.

In another preferred embodiment, in step 1), the heat treatment is carried out at a heat treatment temperature of 550 to 850° C.; and/or
  in step 1), the heat treatment is carried out for a heat treatment time of 5 s to 60 s at the heat treatment temperature.

In another preferred embodiment, in step 1), the heat treatment is carried out at a heat treatment temperature of 580 to 830° C., and preferably 600 to 800° C.

In another preferred embodiment, in step 1), at the heat treatment temperature, the heat treatment is carried out for a heat treatment time of 8 to 55 s, and preferably 10 s to 50 s.

In another preferred embodiment, in step 1), a treatment mode of the heat treatment is selected from the following group consisting of resistance heating, radiation heating, and combinations thereof.

In another preferred embodiment, in step 1), the treatment mode of the heat treatment is a composite heating mode of resistance heating and radiation heating.

In another preferred embodiment, the resistance heating is carried out by self-resistance heating of the plated electrode wire, and when the resistance heating is used, a power applied to the plated electrode wire is 0.1 to 10 KW, and preferably 0.3 to 5 KW.

In another preferred embodiment, the radiation heating is carried out at a radiation treatment temperature of 550 to 850° C., and preferably 600 to 800° C.

In another preferred embodiment, a radiation treatment time at the radiation treatment temperature is from 5 to 60 s, and preferably from 15 to 30 s.

In another preferred embodiment, the heat-treated electrode wire has a diameter of 0.03 to 5 mm, and preferably 0.05 to 4.5 mm.

In another preferred embodiment, the heat-treated electrode wire comprises a first inner layer, a first intermediate layer and a first outer layer.

In another preferred embodiment, the first inner layer has a diameter of 0.02 to 4 mm, and preferably 0.5 to 3 mm.

In another preferred embodiment, the first intermediate layer has a thickness of 3 to 30 μm, and preferably 5 to 20 μm.

In another preferred embodiment, the first outer layer has a thickness of 2 to 20 μm, and preferably 5 to 10 μm.

In another preferred embodiment, in step 2), the drawing treatment is carried out in a lubricating oil sump; and/or in step 2), the drawing treatment is carried out at room temperature; and/or in step 2), the drawing treatment is carried out at a drawing speed of 600 to 1500 m/min.

In another preferred embodiment, in step 2), the drawing treatment is carried out at a drawing speed of 700 to 1400 m/min, and preferably 800 to 1300 m/min.

In another preferred embodiment, the drawn electrode wire has a diameter of 0.1 to 1 mm, and preferably 0.15 to 0.6 mm.

In another preferred embodiment, in step 3), the annealing treatment is carried out at an annealing treatment temperature of 20 to 100° C.; and/or in step 3), at the annealing treatment temperature, the annealing treatment is carried out for an annealing treatment time of 1 s to 20 s.

In another preferred embodiment, in step 3), the annealing treatment is carried out at an annealing treatment temperature of 30° C. to 80° C., and preferably 35 to 70° C.

In another preferred embodiment, in step 3), at the annealing treatment temperature, the annealing treatment is carried out for an annealing treatment time of 3 to 15 s, and preferably 4 to 10 s.

In another preferred embodiment, in step 3), the annealing treatment is carried out by electric heating a wire wrapping copper roller, and the annealing treatment is carried out at a voltage of 10 to 50 V and a current of 5 to 30 A.

In the third aspect of the present invention, it provides a use of the electrode wire material according to the first aspect of the present invention for performing fine cutting.

In the fourth aspect of the present invention, it provides an article, and the article comprises the electrode wire material of the first aspect of the present invention or is made of the electrode wire material according to the first aspect of the present invention.

It should be understood that in the present invention any of the technical features specifically described above and below (such as in the examples) can be combined with each other, thereby constituting new or preferred technical solutions which will not redundantly be described one by one herein.

DETAILED DESCRIPTION OF INVENTION

Through long and deep research, the inventors have prepared an electrode wire material having a special bionic structure by using a specific preparation process. In particular, the inventors have prepared an electrode wire material having a scale-style micro-texture surface morphology by using a specific heat treatment process in combination with a specific drawing process, and the porous morphology on the surface of the material makes the resistance between the electrode wire material and the cut sample significantly reduced, and can effectively improve the discharge of debris and the circulation effect of cooling liquid during the cutting process, and ultimately improve the cutting speed of the electrode wires. On this basis, the inventors have completed the present invention.

Terms

As used herein, the term "cooling liquid" refers to an industrial liquid used to cool and lubricate chip tools and workpieces during metal cutting and grinding processes, which has good cooling performance, lubricating properties, anti-rust properties, degreasing cleaning function and anti-corrosion function.

Electrode Wire Material

An electrode wire material is provided in the present invention, and the electrode wire material has a scale-style micro-texture layer on the surface, and the electrode wire material comprises:

i) an alloy substrate layer as an inner layer;
ii) an interdiffusion layer as an intermediate layer;
iii) a plating layer as an outer layer;
and a contact angle of the electrode wire material to a cooling liquid is 105 to 150°.

Figure 1:
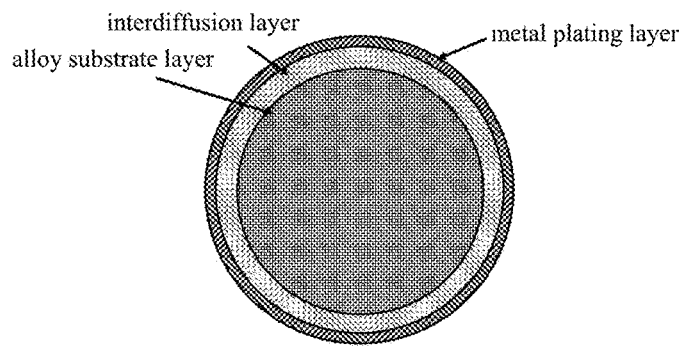
FIG. 1 is a structure schematic graph of the scale-style micro-texture electrode wire material of the present invention.

FIG. 1 is a structure schematic graph of the scale-style micro-texture electrode wire material of the present invention.

In another preferred embodiment, the contact angle of the electrode wire material to the cooling liquid is 107 to 140°.

In another preferred embodiment, the contact angle of the electrode wire material to the cooling liquid is 110 to 135°, and preferably 112 to 130°.

In another preferred embodiment, the electrode wire material has a diameter of 0.05 to 1 mm, preferably 0.1 to 0.8 mm, and more preferably 0.15 to 0.6 mm.

In another preferred embodiment, in the electrode wire material, the inner layer has a diameter of 0.15-0.6 mm; and/or
the intermediate layer has a thickness of 5 to 30 µm; and/or
the outer layer has a thickness of 2 to 20 µm.

In another preferred embodiment, the inner layer has a diameter of 0.15 to 0.4 mm.

In another preferred embodiment, the intermediate layer has a thickness of 10 to 20 µm.

In another preferred embodiment, the outer layer has a thickness of 4 to 10 µm.

In another preferred embodiment, the scale-style micro-texture layer has a thickness of 2 to 20 µm.

In another preferred embodiment, the scale-style micro-texture layer has a thickness of 3 to 18 µm, and preferably 5 to 15 µm.

It should be understood that when the thickness of the scale-style micro-texture layer is greater than 20 µm, the deepness of the microstructure of the scale-style micro-texture layer is shallower, which makes the contact angle of the electrode wire to the cooling liquid reduced, thereby reducing the cutting speed of the electrode wire; when the thickness of the scale-style micro-texture layer is less than 2 µm, the scale-style micro-texture layer is too thin and easy to fail early due to wear, so it can not effectively improve the cutting speed of the electrode wire.

In the present invention, in the electrode wire material, the elements of the inner layer, the intermediate layer and the outer layer are formed by thermally diffusing, so there is a certain concentration gradient of the elements.

In another preferred embodiment, the alloy substrate layer is made from elements including (but not limited to) copper, zinc, tin, lead, and combinations thereof.

In another preferred embodiment, the interdiffusion layer is made from elements including (but not limited to) copper, zinc, tin, lead, and combinations thereof.

In another preferred embodiment, the plating layer is made from elements including (but not limited to) copper, zinc, tin, lead, and combinations thereof.

In another preferred embodiment, the electrode wire material has a tensile strength of 900 to 1200 MPa, and preferably 1100 MPa to 1200 MPa.

In another preferred embodiment, the electrode wire material has an elongation of 1 to 5%, and preferably 3 to 5%.

In another preferred embodiment, the electrode wire material is prepared by the method of the present invention.

In the present invention, the electrode wire material has a special scale-style micro-texture on the surface, which makes that the electrode wire material has a greater contact angle to the cooling liquid, thereby remarkably improving the cooling effect of the cooling liquid and greatly improving the cutting speed.

Preparation Method

A method for preparing the electrode wire material is also provided in the present invention, comprising the following steps:

1) providing a plated electrode wire, and heat-treating the plated electrode wire to obtain a heat-treated electrode wire;
2) drawing the heat-treated electrode wire obtained in step 1) to obtain a drawn electrode wire; and
3) annealing the drawn electrode wire obtained in step 2) to obtain the electrode wire material.

Figure 2:
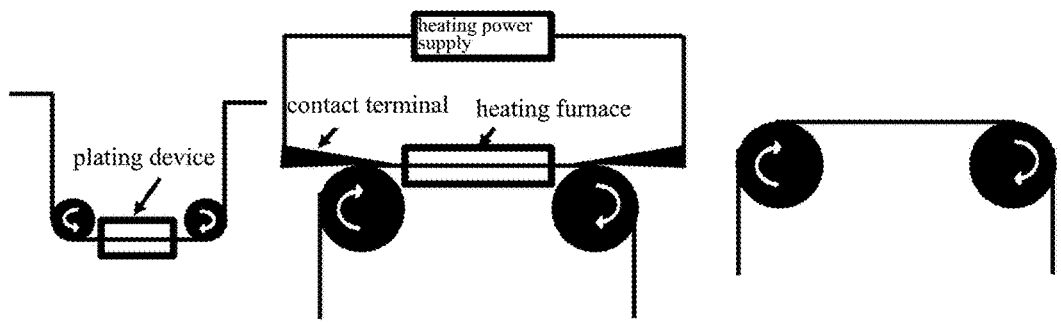
FIG. 2 is a process schematic graph of the preparation method of the present invention.

FIG. 2 is a process schematic graph of the preparation method of the present invention.

In another preferred embodiment, the plated electrode wire comprises an alloy layer as a core layer and a metal plating layer on the surface of the core layer.

In another preferred embodiment, the alloy layer is made from materials including (but not limited to) a copper alloy and a stainless steel.

In another preferred embodiment, the metal plating layer is made from metals including (but not limited to) zinc, copper, tin, lead, and combinations thereof.

In another preferred embodiment, the plated electrode wire has a diameter of 0.01 to 5 mm, preferably 0.05 to 3 mm, and more preferably 0.1 to 2 mm.

In another preferred embodiment, the metal plating layer has a thickness of 1 to 50 µm, preferably 2 to 30 µm, and more preferably 4 to 15 µm.

It should be understood that in the present invention, the thickness selection of the metal plating layer of the plated electrode wire in step 1) has an important effect on the subsequent heat treatment step and the drawing step. When the thickness of the metal plating layer is more than 50 µm, during the heat treatment process, the metal plating layer and the inner substrate layer can not interdiffuse well, and the above insufficient-interdiffused wire blank will not obtain obvious scale-style micro-texture structure in the subsequent drawing step; When the thickness of the metal plating layer is less than 1 µm, the zinc plating layer is lost due to the melting and sublimation at a high temperature, so it can not perform interdiffusion with the substrate, which affects the preparation of the scale-style micro-texture structure and finally affects the cutting speed of the electrode wire.

In another preferred embodiment, in step 1), the heat treatment is carried out at a heat treatment temperature of 550 to 850° C.; and/or in step 1), the heat treatment is carried out for a heat treatment time of 5 s to 60 s at the heat treatment temperature.

It should be understood that in the preparation method of the present invention, the treatment temperature range and the treatment time range of the heat treatment in step 1) also have an important influence on the performance of the finally obtained electrode wire material. When the heat treatment temperature is lower than 550° C., the electrode wire material obtained after the heat treatment does not have scale-style microstructure; when the heat treatment temperature is higher than 850° C., during the heat treatment process, the metal plating layer is obviously melted and volatilized, which makes that the obtained electrode wire material also does not have obvious scale-style microstructure. When the heat treatment time at the heat treatment temperature is greater than 60 s, the metal plating layer is also liable to be melted and volatilized, and finally the resulted electrode wire material also does not has obvious scale-style microstructure; when the heat treatment time at the heat treatment temperature is less than 5 s, the final resulted electrode wire material also does not have obvious scale-style microstructure.

In another preferred embodiment, in step 1), the heat treatment is carried out at a heat treatment temperature of 580 to 830° C., and preferably 600 to 800° C.

In another preferred embodiment, in step 1), at the heat treatment temperature, the heat treatment is carried out for a heat treatment time of 8 to 55 s, and preferably 10 s to 50 s.

In another preferred embodiment, in step 1), a treatment mode of the heat treatment includes (but is not limited to) resistance heating, radiation heating, and combinations thereof.

In another preferred embodiment, in step 1), the treatment mode of the heat treatment is a composite heating mode of resistance heating and radiation heating.

In another preferred embodiment, the resistance heating is carried out by self-resistance heat of the plated electrode wire, and when the resistance heating is used, a power applied to the plated electrode wire is 0.1 to 10 KW, and preferably 0.3 to 5 KW.

In another preferred embodiment, the radiation heating is carried out at a radiation treatment temperature of 550 to 850° C., and preferably 600 to 800° C.

In another preferred embodiment, the radiation treatment time at the radiation treatment temperature is from 5 to 60 s, and preferably from 15 to 30 s.

In another preferred embodiment, the heat-treated electrode wire has a diameter of 0.03 to 5 mm, and preferably 0.05 to 4.5 mm.

In another preferred embodiment, the heat-treated electrode wire comprises a first inner layer, a first intermediate layer and a first outer layer.

In another preferred embodiment, the first inner layer has a diameter of 0.02 to 4 mm, and preferably 0.5 to 3 mm.

In another preferred embodiment, the first intermediate layer has a thickness of 3 to 30 μm, and preferably 5 to 20 μm.

In another preferred embodiment, the first outer layer has a thickness of 2 to 20 μm, and preferably 5 to 10 μm.

In another preferred embodiment, in step 2), the drawing treatment is carried out in a lubricating oil sump; and/or in step 2), the drawing treatment is carried out at room temperature; and/or in step 2), the drawing treatment is carried out at a drawing speed of 600 to 1500 m/min.

It should be understood that in the preparation method of the present invention, when the drawing speed in step 2) is greater than 1500 m/min, the drawn electrode wire is very easily broken during the drawing process; when the drawing speed in step 2) is less than 600 m/min, the electrode wire material obtained after the drawing does not have obvious scale-style microstructure.

In another preferred embodiment, in step 2), the drawing treatment is carried out at a drawing speed of 700 to 1400 m/min, and preferably 800 to 1300 m/min.

In another preferred embodiment, the drawn electrode wire has a diameter of 0.1 to 1 mm, and preferably 0.15 to 0.6 mm.

In another preferred embodiment, in step 3), the annealing treatment is carried out at an annealing treatment temperature of 20 to 100° C.; and/or in step 3), at the annealing treatment temperature, the annealing treatment is carried out for an annealing treatment time of 1 s to 20 s.

In another preferred embodiment, in step 3), the annealing treatment is carried out at an annealing treatment temperature of 30° C. to 80° C., and preferably 35 to 70° C.

In another preferred embodiment, in step 3), at the annealing treatment temperature, the annealing treatment is carried out for an annealing treatment time of 3 to 15 s, and preferably 4 to 10 s.

In another preferred embodiment, in step 3), the annealing treatment is carried out by electric heating a wire wrapping copper roller, and the annealing treatment is carried out at a voltage of 10 to 50 V and a current of 5 to 30 A.

Application

A use of the electrode wire material is also provided in the present invention, for performing fine cutting.

An article is also provided in the present invention, and the article comprises the electrode wire material or is made of the electrode wire material.

Compared with the prior art, the present invention has the following main advantages:

(1) the electrode wire material has scale-style micro-texture on the surface, and the special bionic structure makes the electrode wire material have excellent cooling effect for the cooling liquid, thereby obtaining a higher cutting speed, which can remarkably improve the use properties of the obtained electrode wire materials, for example, the cutting speed is 10% to 20% greater than that of the ordinary copper electrode wire with a zinc plating layer, and at least 23% greater than that of the ordinary copper wire without a zinc plating layer;

(2) the special scale-style micro-texture on the surface of the electrode wire material makes it have a very low cutting resistance and the debris can be discharged smoothly during the cutting process, thereby increasing the cutting speed without reducing the surface roughness of the cut sample;

(3) the method for preparing the electrode wire material has the advantages such as simple process, low cost and easy for industrial production.

The present invention will be further illustrated below with reference to the specific examples. It should be understood that these examples are only to illustrate the invention but not to limit the scope of the invention. The experimental methods with no specific conditions described in the following examples are generally performed under the conventional conditions, or according to the manufacture's instructions. Unless indicated otherwise, parts and percentage are calculated by weight.

Unless otherwise defined, all professional and scientific terminology used in the text have the same meanings as known to the skilled in the art. In addition, any methods and materials similar or equal with the record content can apply to the methods of the invention. The method and the material of the preferred embodiment described herein are only for demonstration purposes.

Example 1 Electrode Wire Material 1

(1) Copper alloy wire galvanization: firstly, a copper alloy wire having a diameter of about 1.5 mm was put into a plating device after it was derusted and degreasing cleaned, and subjected to galvanizing treatment. Copper alloy wire 1 with a zinc plating layer having a thickness of about 5 μm was obtained by adjusting galvanizing process.

(2) Diffusion heat treatment: the copper alloy wire 1 was subjected to diffusion heat treatment, and a resistance/radiation composite heating method was selected, and the copper alloy wire 1 passed through a resistance furnace having a length of 1 m at a temperature of 750° C. at a speed of 0.05 m/s, and the power applied to the wire was 1 KW (the equivalent heat treatment temperature of the composite heating method was 800° C. and the equivalent heat treatment time was 20 s in the present example), and wire blank 1 having a three-layered structure of a metal plating layer, an interdiffusion layer and a copper alloy substrate layer was obtained, and its diameter is about 1.5 mm.

(3) Drawing treatment: the obtained was drawn into a micro-texture electrode wire having a diameter of 0.25 mm at a drawing speed of 1000 m/min, followed by stress relieving annealing treatment for 5 s at a voltage of 30V and a current of 10 A (for the wire, the equivalent annealing temperature was 40° C.), thereby obtaining an electrode wire material 1.

Result

The heat-treated wire blank 1 having a three-layered structure and the electrode wire material 1 obtained in Example 1 were subjected to tests for such as surface and section morphology and component analysis, contact angle and cutting property.

Figure 3:
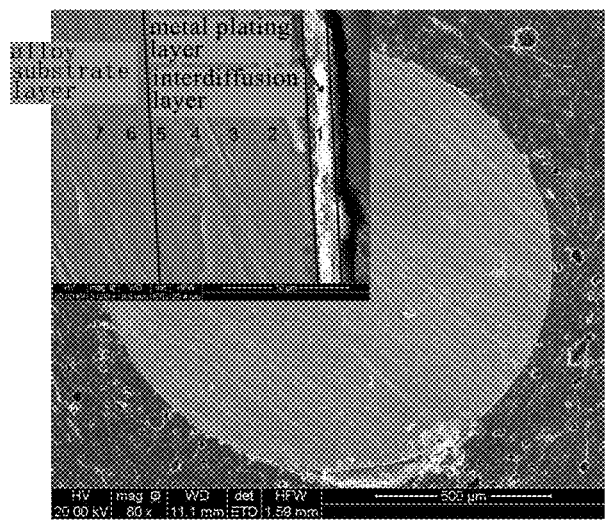
FIG. 3 is a SEM section morphology test result of the heat-treated wire blank 1 having a three-layered structure in Example 1.

FIG. 3 was a SEM section morphology test result of the heat-treated wire blank 1 having a three-layered structure in Example 1.

It could be seen from FIG. 3 that, after the heat treatment, the obtained wire blank 1 had a three-layered structure including an alloy substrate layer, an interdiffusion layer and a metal plating layer, in which the diameter of the alloy substrate layer was 1.25 mm, and the thickness of the interdiffusion layer was 12 μm, and the thickness of the metal plating layer was 4 μm.

The components at sites 1, 2, 3, 4, 5, 6 and 7 in FIG. 3 were further tested by using an energy dispersive spectrometer, and the results were shown in Table 1.

TABLE 1

| testing area | Zn wt. % | Cu wt. % | O wt. % |
| --- | --- | --- | --- |
| 1 | 84.64 | 12.78 | 2.58 |
| 2 | 72.84 | 25.11 | 2.03 |
| 3 | 57.44 | 41.20 | 1.36 |
| 4 | 48.76 | 50.35 | 0.89 |
| 5 | 42.92 | 56.41 | 0.67 |
| 6 | 39.04 | 60.43 | 0.53 |
| 7 | 39.68 | 59.89 | 0.43 |

It could be seen from Table 1 that, in the heat-treated wire blank 1 having a three-layered structure the content of Zn gradually decreased and the content of Cu gradually increased from the outside to the inside in the radial direction (i.e., from site 1 to site 7), and there was still a small amount of O on the outer layer since the heat treatment process was conducted in an air atmosphere at a high temperature. The above results showed that, during the heat treatment process, obvious interdiffusion occurred between the zinc plating layer and the substrate alloy, thereby forming a three-layered structure including the alloy substrate layer, the interdiffusion layer and the metal plating layer.

Figure 4:
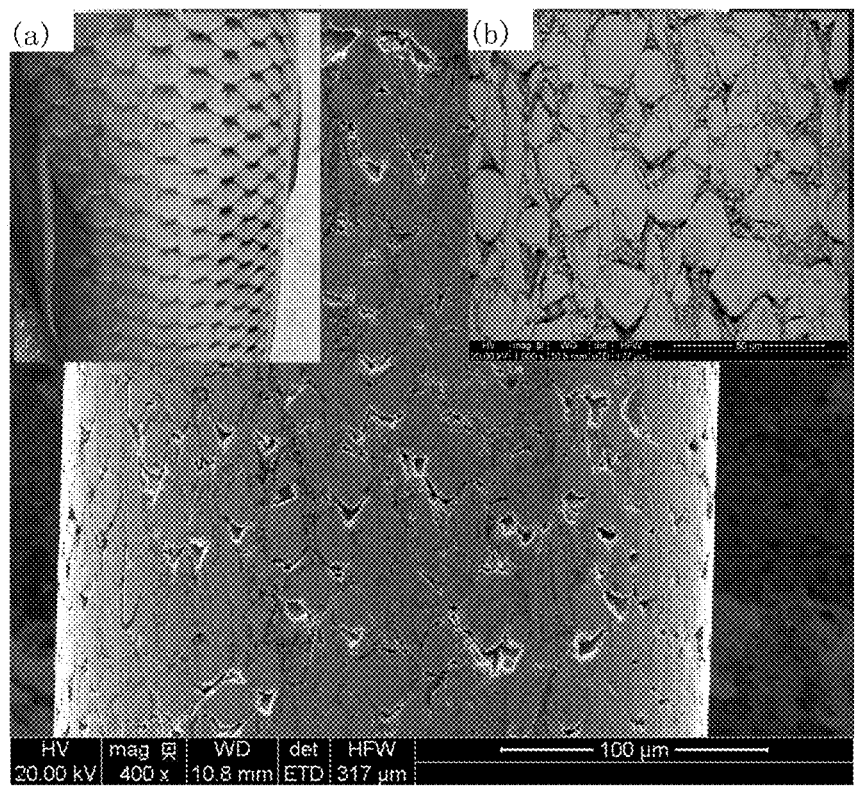
FIG. 4 is a SEM surface morphology test result of the electrode wire material 1 obtained in Example 1, in which (a) is scale morphology of a fish and (b) is an enlarged SEM surface morphology of the electrode wire material 1.

FIG. 4 was a SEM surface morphology test result of the electrode wire material 1 obtained in Example 1, in which, (a) is a scale morphology of a fish and (b) is an enlarged SEM surface morphology of the electrode wire material 1.

It could be seen from FIG. 4 that, the electrode wire material 1 obtained in Example 1 had a scale-style microtexture of very high simulation degree on the micro-surface, and the obtained electrode wire material 1 had a diameter of 0.25 mm.

Figure 5:
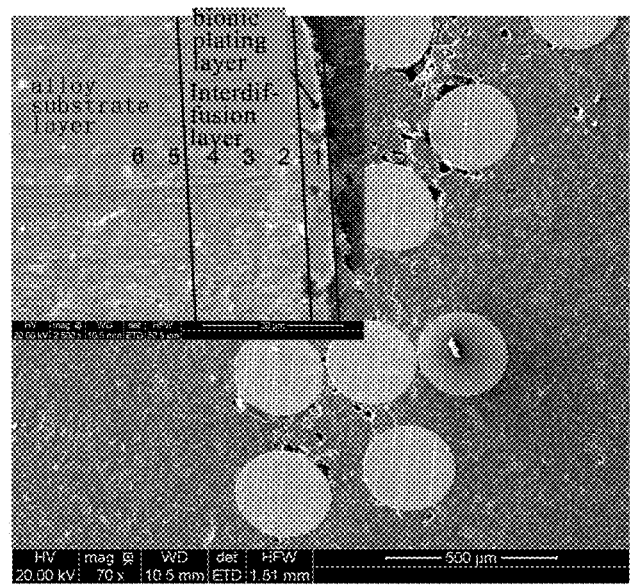
FIG. 5 is a SEM section morphology test result of the electrode wire material 1 obtained in Example 1.

FIG. 5 was a SEM section morphology test result of the electrode wire material 1 obtained in Example 1.

It could be seen from FIG. 5 that, the electrode wire material 1 obtained in Example 1 had a three-layered structure including an alloy substrate layer, an interdiffusion layer and a bionic plating layer, in which the diameter of the alloy substrate layer was 0.25 mm, and the thickness of the interdiffusion layer was 15 μm, and the thickness of the metal plating layer was 5 μm.

The components at sites 1, 2, 3, 4, 5 and 6 in FIG. 5 were further tested by using an energy dispersive spectrometer, and the results were shown in Table 2.

TABLE 2

| testing area | Zn wt. % | Cu wt. % | O wt. % |
| --- | --- | --- | --- |
| 1 | 72.52 | 23.1 | 4.38 |
| 2 | 64.56 | 31.87 | 3.57 |
| 3 | 49.37 | 48.22 | 2.41 |
| 4 | 43.15 | 55.23 | 1.62 |
| 5 | 39.84 | 59.12 | 1.04 |
| 6 | 39.62 | 59.45 | 0.93 |

It could be seen from Table 2 that, in the electrode wire material 1 the content of Zn gradually decreased and the content of Cu gradually increased from the outside to the inside in the radial direction (i.e., from site 1 to site 6), and there was still a small amount of O on the outer layer. The above results further showed that the obtained electrode wire material having a scale-style micro-texture also had a three-layered structure.

Figure 6:
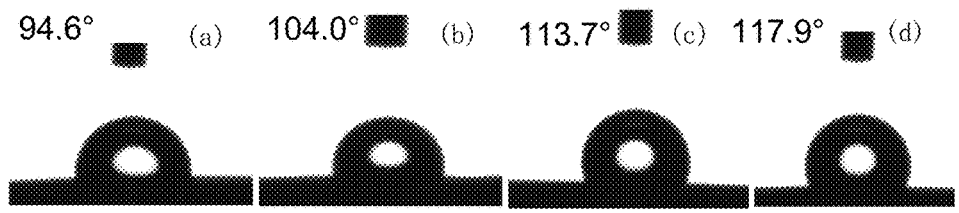
FIG. 6 shows contact angle test results of the copper alloy wire, the copper alloy wire 1 and the electrode wire material 1 to the cooling liquid, in which (a) is for copper alloy wire, (b) is for copper alloy wire 1, and (c) and (d) are for the scale-style micro-texture electrode wire material 1.

FIG. 6 showed test results for the contact angle of the copper alloy wire (i.e. copper alloy wire without any plating layer), the copper alloy wire 1 (i.e. copper alloy wire with zinc plating layer) and the electrode wire material 1 to the cooling liquid, in which (a) was for copper alloy wire, (b) was for copper alloy wire 1, and (c) and (d) were for the scale-style micro-texture electrode wire material 1.

It could be seen from FIG. 6 that, compared with copper alloy wire without zinc plating layer and copper alloy wire with only zinc plating layer, the electrode wire material 1 of the present invention having a specific scale-style microtexture had a greater contact angle to the cooling liquid, thereby significantly improving the lubrication effect of the cooling liquid to the electrode wire material during the cutting process.

Figure 7:
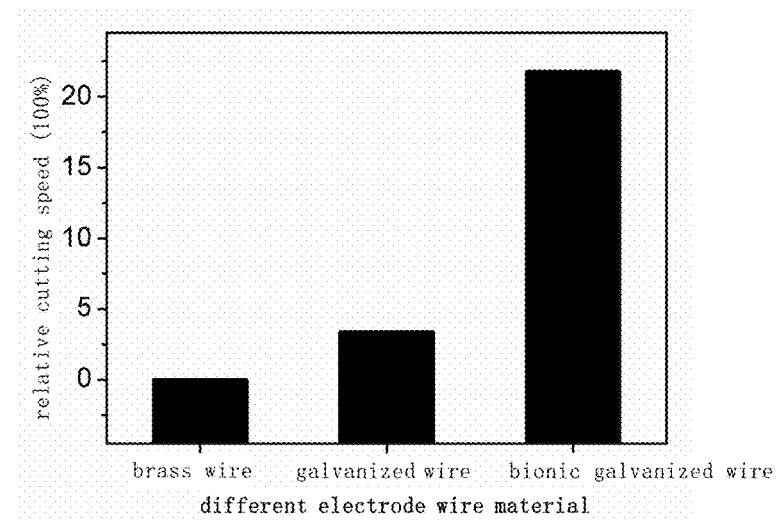
FIG. 7 is a comparison graph of the relative cutting speed of the copper alloy wire, the copper alloy wire 1 and the electrode wire material 1.

FIG. 7 was a comparison graph of the relative cutting speed of the copper alloy wire, the copper alloy wire 1 and the electrode wire material 1.

It could be seen from FIG. 7 that, the cutting speed of the scale-style micro-texture electrode wire material 1 of the present invention was improved by about 23% when compared with that of the conventional copper alloy wire without zinc plating layer and by about 16% when compared with that of the copper alloy wire 1 with zinc plating layer.

Figure 8:
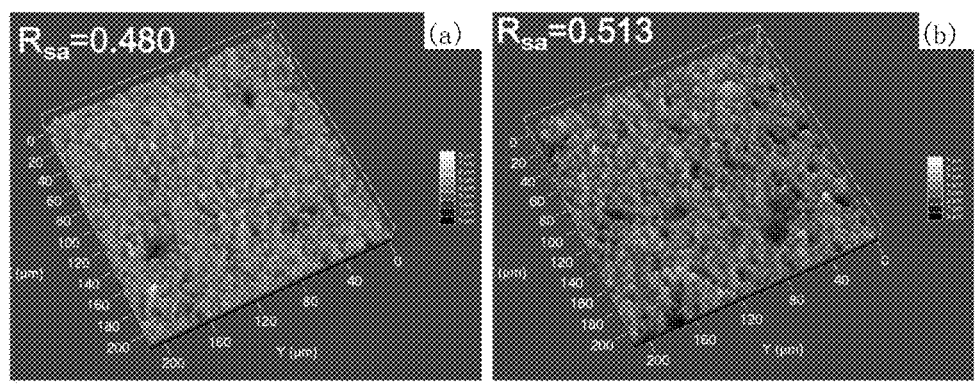
FIG. 8 shows three-dimensional morphology test results of mold steel samples after being cut by the copper alloy wire 1 and the electrode wire material 1 respectively at the same cutting speed, in which (a) is a three-dimensional morphology of the sample after being cut by the copper alloy wire 1, and (b) is a three-dimensional morphology after being cut by the scale-style micro-texture electrode wire material 1.

FIG. 8 was three-dimensional morphology test results of mold steel samples after being cut by the copper alloy wire 1 and the electrode wire material 1 at the same cutting speed respectively, in which (a) was a three-dimensional morphology of the sample after being cut by the copper alloy wire 1, and (b) was a three-dimensional morphology after being cut by the scale-style micro-texture electrode wire material 1.

It could be seen from FIG. 8 that, the surface roughness of the sample cut by the scale-style micro-texture electrode wire material 1 was equivalent to that of the sample cut by the copper alloy wire 1.

In addition, the mechanical property test results of the copper alloy wire, the copper alloy wire 1 and the electrode wire material 1 showed that the three had equivalent tensile strength (about 1100 MPa) and elongation (about 5%).

Example 2 Electrode Wire Material 2

(1) Copper alloy wire galvanization: firstly, a copper alloy wire having a diameter of about 1 mm was put into a plating device after it was derusted and degreasing cleaned, and subjected to galvanizing treatment. Copper alloy wire 2 with a zinc plating layer having a thickness of about 10 μm was obtained by adjusting galvanizing process.

(2) Diffusion heat treatment: the copper alloy wire 2 was subjected to diffusion heat treatment, and a resistance/radiation composite heating method was selected, and the copper alloy wire 2 passed through a resistance furnace having a length of 1 m at a temperature of 650° C. at a speed of 0.02 m/s, and the power applied to the wire was 0.5 KW (the equivalent heat treatment temperature of the composite heating method was 690° C. and the equivalent heat treatment time was 50 s in the present example), and wire blank 2 having a three-layered structure of a metal plating layer, an interdiffusion layer and a copper alloy substrate layer was obtained, and its diameter is 1.5 mm.

(3) Drawing treatment: the above heat-treated wire blank 2 having a three-layered structure was drawn into a micro-texture electrode wire having a diameter of 0.25 mm at a drawing speed of 1200 m/min, followed by stress relieving annealing treatment for 5 s at a voltage of 30V and a current of 10 A (for the wire, the equivalent annealing temperature was 40° C.), thereby obtaining an electrode wire material 2.

Example 3 Electrode Wire Material 3

(1) Copper alloy wire galvanization: firstly, a copper alloy wire having a diameter of 1.2 mm was put into a plating device after it was derusted and degreasing cleaned, and subjected to galvanizing treatment. Copper alloy wire 3 with a zinc plating layer having a thickness of 10 μm was obtained by adjusting galvanizing process.

(2) Diffusion heat treatment: the copper alloy wire 1 was subjected to diffusion heat treatment, and a resistance/radiation composite heating method was selected, and the copper alloy wire 3 passed through a resistance furnace having a length of 1 m having a temperature of 680° C. at a speed of 0.1 m/s, and the power applied to the wire was 1 KW (the equivalent heat treatment temperature of the composite heating method was 710° C. and the equivalent heat treatment time was 10 s in the present example), and wire blank 3 having a three-layered structure of a metal plating layer, an interdiffusion layer and a copper alloy substrate layer was obtained.

(3) Drawing treatment: the above heat-treated wire blank 3 having a three-layered structure was drawn into a micro-texture electrode wire having a diameter of 0.2 mm at a drawing speed of 1000 m/min, followed by stress relieving annealing treatment for 5 s at a voltage of 30V and a current of 10 A (for the wire, the equivalent annealing temperature was 40° C.), thereby obtaining an electrode wire material 3.

Example 4 Electrode Wire Material 4

(1) Copper alloy wire galvanization: firstly, a copper alloy wire having a diameter of 1.5 mm was put into a plating device after it was derusted and degreasing cleaned, and subjected to galvanizing treatment. Copper alloy wire 4 with a zinc plating layer having a thickness of 8 μm was obtained by adjusting galvanizing process;

(2) Diffusion heat treatment: the copper alloy wire 4 was subjected to diffusion heat treatment, and a resistance/radiation composite heating method was selected, and the copper alloy wire 4 passed through a resistance furnace having a length of 1 m at a temperature of 700° C. at a speed of 0.05 m/s, and power applied to the wire was 1.5 KW (the equivalent heat treatment temperature of the composite heating method was 780° C. and the equivalent heat treatment time was 20 s in the present example), and wire blank 4 having a three-layered structure of a metal plating layer, an interdiffusion layer and a copper alloy substrate layer was obtained;

(3) Drawing treatment: the above heat-treated wire blank 4 having a three-layered structure was drawn into a micro-texture electrode wire having a diameter of 0.3 mm at a drawing speed of 800 m/min, followed by stress relieving annealing treatment for 5 s at a voltage of 30V and a current of 10 A (for the wire, the equivalent annealing temperature was 40° C.), thereby obtaining an electrode wire material 4.

Result

Figure 9:
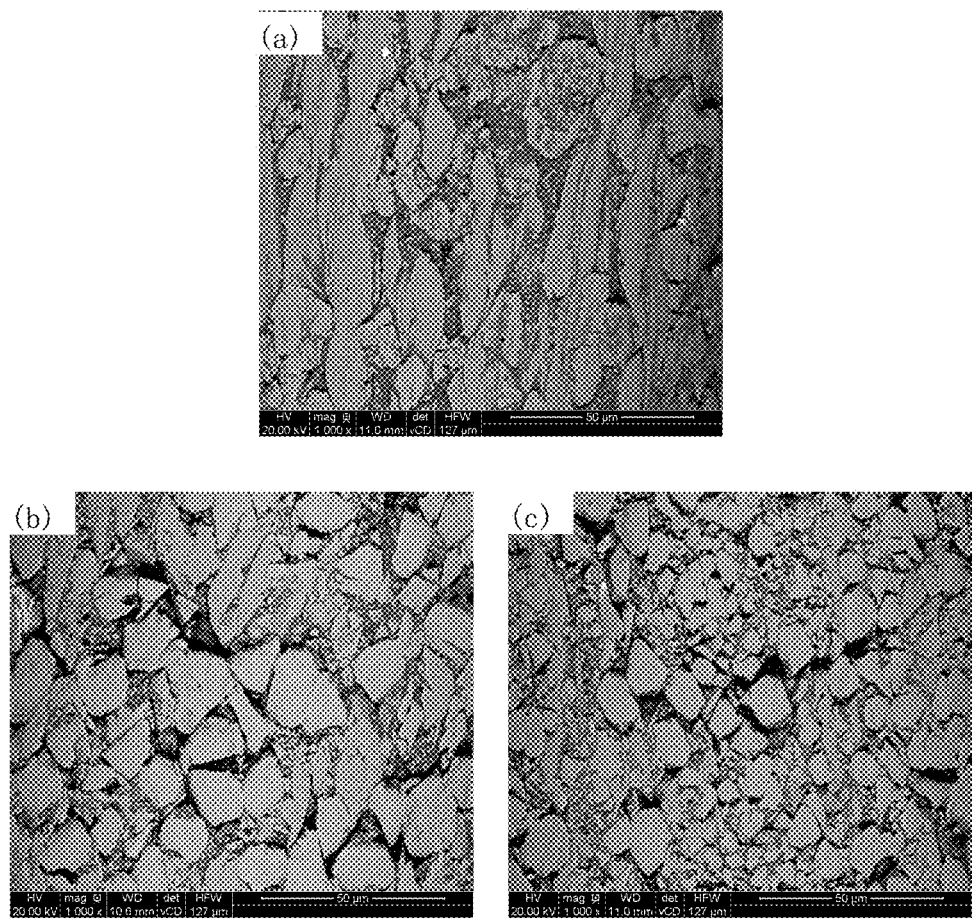
FIG. 9 shows SEM surface morphology test results of the electrode wire materials 2 to 4 obtained in Examples 2 to 4, in which (a) is for the electrode wire material 2, (b) is for the electrode wire material 3, and (c) is for the electrode wire material 4.

FIG. 9 showed SEM surface morphology test results of the electrode wire materials 2 to 4 obtained in Examples 2 to 4, in which (a) was for electrode wire material 2, (b) was for electrode wire material 3, and (c) was for electrode wire material 4.

It could be seen from FIG. 9 that, all of the electrode wire materials 2 to 4 obtained by the specific electroplating treatment process, the heat treatment process, the drawing treatment process and the annealing treatment process of the present invention exhibited the scale-style micro-texture surface morphology.

Comparative Example 1 Electrode Wire Material C1

This example was the same as Example 1 except for the difference that the heat treatment temperature was 500° C.

Result

Figure 10:
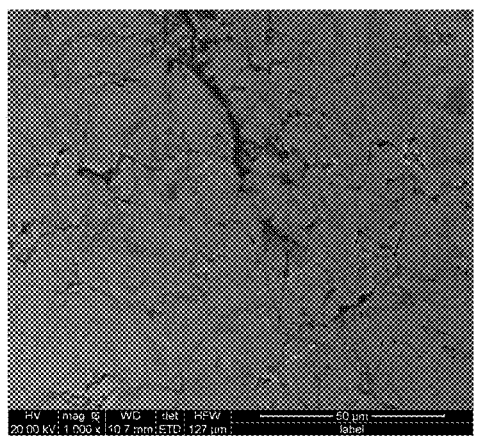
FIG. 10 is a SEM surface morphology test result of the electrode wire material C1 obtained in Comparative Example 1.

FIG. 10 was a SEM surface morphology test result of the electrode wire material C1 obtained in Comparative Example 1.

It could be seen from FIG. 10 that, after the treatment at the heat treatment temperature in Comparative Example 1, no significant scale-style structure appeared on the surface of the obtained electrode wire material C1. When the electrode wire material C1 was used to cut mold steel sample, the cutting speed was basically unchanged compared with that when the conventional copper wire with a zinc plating layer was used.

Comparative Example 2 Electrode Wire Material C2

This example was the same as Example 1 except for the difference that the heat treatment temperature was 880° C.

Result

Figure 11:
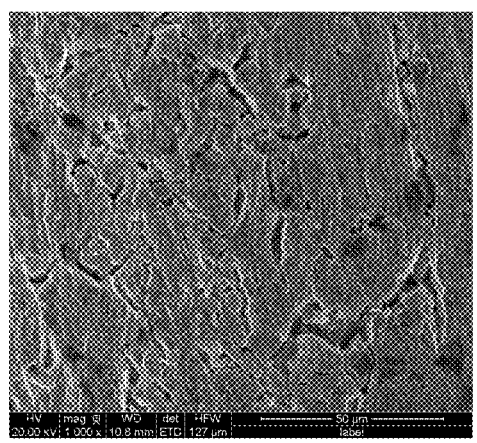
FIG. 11 is a SEM surface morphology test result of the electrode wire material C2 obtained in Comparative Example 2.

FIG. 11 was a SEM surface morphology test result of the electrode wire material C2 obtained in Comparative Example 2.

It could be seen from FIG. 11 that, after the treatment at that heat treatment temperature a large amount of microcracks appeared on the surface of the obtained electrode wire material C2, and no obvious micro-texture was observed. When the electrode wire material C2 was used to cut mold steel sample, the cutting speed was basically unchanged compared with that when the conventional copper wire with a zinc plating layer was used.

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. An electrode wire material, wherein the electrode wire material has a scale-style micro-texture layer on the surface, and the electrode wire material comprises:
   i) an alloy substrate layer as an inner layer;
   ii) an interdiffusion layer as an intermediate layer;
   iii) a plating layer as an outer layer;
   and a contact angle of the electrode wire material to a cooling liquid is 105 to 150°;
   the intermediate layer has a thickness of 10 to 30 μm;
   the outer layer has a thickness of 2 to 10 μm;
   the intermediate layer is continuous;
   the outer layer is discontinuous;
   wherein in the electrode wire material, a content of Zn gradually decreases from an outside to an inside in a radial direction;
   wherein a content of Zn of the interdiffusion layer is 43.15 wt % to 64.56 wt %, a content of Zn of the alloy substrate layer is less than 43.15 wt %, and a content of Zn of the plating layer is more than 64.56 wt %;
   wherein the electrode wire material is prepared as follows:
   1) providing a plated electrode wire, and heat-treating the plated electrode wire to obtain a heat-treated electrode wire;
   2) drawing the heat-treated electrode wire obtained in step 1) to obtain a drawn electrode wire; and
   3) annealing the drawn electrode wire obtained in step 2) to obtain the electrode wire material;
   in step 1), the heat treatment is carried out at a heat treatment temperature of 550 to 850° C.

2. The electrode wire material of claim 1, wherein the contact angle of the electrode wire material to the cooling liquid is 107 to 140°.

3. The electrode wire material of claim 1, wherein, in the electrode wire material, the inner layer has a diameter of 0.15 to 0.6 mm; and/or
   the intermediate layer has a thickness of 15 to 30 μm; and/or
   the outer layer has a thickness of 2 to 5 μm.

4. The electrode wire material of claim 1, wherein, the scale-style micro-texture layer has a thickness of 2 to 5 μm.

5. The electrode wire material of claim 1, wherein the alloy substrate layer is made from elements selected from the following group consisting of copper, zinc, tin, lead, and combinations thereof.

6. The electrode wire material of claim 1, wherein the interdiffusion layer is made from elements selected from the following group consisting of copper, zinc, tin, lead, and combinations thereof.

7. The electrode wire material of claim 1, wherein the plating layer is made from elements selected from the following group consisting of copper, zinc, tin, lead, and combinations thereof.

8. The electrode wire material of claim 1, wherein the electrode wire material has a tensile strength of 900 to 1200 MPa.

9. The electrode wire material of claim 1, wherein the electrode wire material has an elongation of 1 to 5%.

10. The electrode wire material of claim 1, wherein in step 1), the heat treatment is carried out for a heat treatment time of 5 s to 60 s at the heat treatment temperature.

11. The electrode wire material of claim 1, wherein in step 2), the drawing treatment is performed in a lubricating oil sump; and/or
   in step 2), the drawing treatment is carried out at room temperature; and/or
   in step 2), the drawing treatment is carried out at a drawing speed of 600 to 1500 m/min.

12. The electrode wire material of claim 1, wherein in step 3), the annealing treatment is carried out at an annealing treatment temperature of 20 to 100° C.; and/or
   in step 3), at the annealing treatment temperature, the annealing treatment is carried out for an annealing treatment time of 1 s to 20 s.

13. A use of an electrode wire material, wherein, the electrode wire material has a scale-style micro-texture layer on the surface, and the electrode wire material comprises:
   i) an alloy substrate layer as an inner layer;
   ii) an interdiffusion layer as an intermediate layer;
   iii) a plating layer as an outer layer;
   and a contact angle of the electrode wire material to a cooling liquid is 105 to 150°;
   the intermediate layer has a thickness of 10 to 30 μm;
   the outer layer has a thickness of 2 to 10 μm;
   the intermediate layer is continuous;
   the outer layer is discontinuous;
   wherein in the electrode wire material, a content of Zn gradually decreases from an outside to an inside in a radial direction;
   wherein a content of Zn of the interdiffusion layer is 43.15 wt % to 64.56 wt %, a content of Zn of the alloy substrate layer is less than 43.15 wt %, and a content of Zn of the plating layer is more than 64.56 wt %;
   wherein the electrode wire material is prepared as follows:
   1) providing a plated electrode wire, and heat-treating the plated electrode wire to obtain a heat-treated electrode wire;
   2) drawing the heat-treated electrode wire obtained in step 1) to obtain a drawn electrode wire; and
   3) annealing the drawn electrode wire obtained in step 2) to obtain the electrode wire material;
   in step 1), the heat treatment is carried out at a heat treatment temperature of 550 to 850° C.,
   the use is for performing fine cutting.

14. An article, wherein the article comprises an electrode wire material or is made of the electrode wire material,
wherein the electrode wire material has a scale-style micro-texture layer on the surface, and the electrode wire material comprises:
i) an alloy substrate layer as an inner layer;
ii) an interdiffusion layer as an intermediate layer;
iii) a plating layer as an outer layer;
and a contact angle of the electrode wire material to a cooling liquid is 105 to 150°;
the intermediate layer has a thickness of 10 to 30 μm;
the outer layer has a thickness of 2 to 10 μm;
the intermediate layer is continuous;
the outer layer is discontinuous;
wherein in the electrode wire material, a content of Zn gradually decreases from an outside to an inside in a radial direction;
wherein a content of Zn of the interdiffusion layer is 43.15 wt % to 64.56 wt %, a content of Zn of the alloy substrate layer is less than 43.15 wt %, and a content of Zn of the plating layer is more than 64.56 wt %;
wherein the electrode wire material is prepared as follows:
1) providing a plated electrode wire, and heat-treating the plated electrode wire to obtain a heat-treated electrode wire;
2) drawing the heat-treated electrode wire obtained in step 1) to obtain a drawn electrode wire; and
3) annealing the drawn electrode wire obtained in step 2) to obtain the electrode wire material;
in step 1), the heat treatment is carried out at a heat treatment temperature of 550 to 850° C.

\* \* \* \* \*